(12) United States Patent
Fascenda et al.

(10) Patent No.: US 8,364,978 B2
(45) Date of Patent: Jan. 29, 2013

(54) SYSTEM FOR AND METHOD OF AUTO-REGISTRATION WITH CRYPTOGRAPHIC MODULES

(75) Inventors: Anthony Fascenda, Rockville, MD (US); Emil Sturniolo, Medina, OH (US)

(73) Assignee: KOOLSPAN, Inc., Bethesda, MD (US)

( * ) Notice: Subject to any disclaimer, the term of this patent is extended or adjusted under 35 U.S.C. 154(b) by 495 days.

(21) Appl. No.: 12/324,471

(22) Filed: Nov. 26, 2008

(65) Prior Publication Data

US 2009/0172412 A1 Jul. 2, 2009

Related U.S. Application Data

(60) Provisional application No. 61/032,196, filed on Feb. 28, 2008, provisional application No. 60/990,145, filed on Nov. 26, 2007.

(51) Int. Cl.
| | |
|---|---|
| *G06F 11/30* | (2006.01) |
| *G06F 15/177* | (2006.01) |
| *G06F 17/30* | (2006.01) |
| *H04L 9/32* | (2006.01) |
| *H04K 1/00* | (2006.01) |

(52) U.S. Cl. ............ 713/189; 713/1; 713/176; 380/258; 726/28; 726/29

(58) Field of Classification Search .................. 713/155, 713/150–154, 160–167, 189–193, 55; 726/2, 726/11–15; 709/249, 246–247, 49, 246–247; 380/28–30, 255–283
See application file for complete search history.

(56) References Cited

U.S. PATENT DOCUMENTS

| | | | |
|---|---|---|---|
| 2004/0025022 A1 * | 2/2004 | Yach et al. ..................... 713/176 |
| 2005/0074122 A1 * | 4/2005 | Fascenda ..................... 380/258 |
| 2008/0059790 A1 * | 3/2008 | Parkinson et al. ............ 713/155 |

* cited by examiner

*Primary Examiner* — Ashok Patel
*Assistant Examiner* — Evans Desrosiers
(74) *Attorney, Agent, or Firm* — Hunton & Williams LLP

(57) ABSTRACT

A system for and method of registering devices an applications with cryptographic modules is presented. The system and method prevent devices and applications from operating in conjunction with cryptographic modules unless such devices and applications have previously been registered with the module.

15 Claims, 7 Drawing Sheets

Hardware Overview:

| | |
|---|---|
| Model Name: | Power Mac G5 Quad |
| Model Identifier: | PowerMac11,2 |
| Processor Name: | PowerPC G5 (1.1) |
| Processor Speed: | 2.5 GHz |
| Number Of CPUs: | 4 |
| L2 Cache (per CPU): | 1 MB |
| Memory: | 4 GB |
| Bus Speed: | 1.25 GHz |
| Boot ROM Version: | 5.2.7f1 |
| Serial Number: | G8546AF3R70 |

Device Identifiers

PowerMac11,2G8546AF3R70  ⟹  HASH = "f9873ad32310349ac1ed34f"

Device Identifiers String              20-byte hash

TrustChip

| 1 | Registration Register |

Registration Table

| Reg ID | App/ TDK ID | Hash |
|---|---|---|
| 1 | 1c7, 1075 | f9873ad32310349ac1ed34f |
| 2 | 3a1, 0043 | e63be5c09704e1008abb21 |

Fig. 7

SYSTEM FOR AND METHOD OF AUTO-REGISTRATION WITH CRYPTOGRAPHIC MODULES

CROSS-REFERENCE TO RELATED APPLICATIONS

The present application is related to and claims priority to U.S. Patent Application No. 61/032,196 filed Feb. 28, 2008 entitled "System For And Method Of Auto-Registration With Cryptographic Modules" to Fascenda et al., U.S. patent application Ser. No. 12/109,883 filed Apr. 25, 2008 entitled "System And Method Of Cryptographic Provisioning" to Fascenda et al., U.S. Patent Application No. 61/103,111 filed Oct. 6, 2008 entitled "System And Method Of Cryptographic Provisioning" to Fascenda et al., U.S. Patent Application No. 60/990,145 filed Nov. 26, 2007 entitled "Cryptographic System And Method" to Fascenda et al., and U.S. patent application Ser. No. 11/951,202 filed Dec. 5, 2007 entitled "Secure Mobile Telephony" to Fascenda et al., the disclosures of which are hereby incorporated by reference in their entireties.

The present application is related to U.S. Pat. No. 7,325,133 filed Oct. 15, 2004 entitled "Mass Subscriber Management" to Fascenda and U.S. Pat. No. 7,325,134 filed Oct. 7, 2003 entitled "Localized Network Authentication And Security Using Tamper-Resistant Keys" to Fascenda, the disclosures of which are hereby incorporated by reference in their entireties.

FIELD OF THE INVENTION

The present invention generally relates to a technique for registering devices and applications to operate in conjunction with cryptographic modules. More particularly, the present invention relates to a technique for preventing a module from fully operating when coupled to a non-registered device or when access to the module is attempted by a non-registered application.

BACKGROUND OF THE INVENTION

Persistent storage modules such as USB memory sticks and Secure Digital cards may be misplaced, lost or stolen. In such a circumstance, the lost storage modules may contain hundreds of megabytes of corporate, personal or otherwise proprietary data.

Persistent storage modules generally make no distinction between how secure data and non-secure data may be stored and accessed. Such modules often store data without regard to the proprietary nature of the data they are storing. Thus, applications often have to separately encrypt their proprietary data with an application-specific key when storing that data on a general-purpose, removable memory module. Further, some computer operating systems include the capability to encrypt, and decrypt, data written to, and read from, a memory module. However if the module is coupled to a device that does not support cryptographic operations, access to encrypted stored data is prevented.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which:

FIG. 7 is a detail of a registration table according to an embodiment of the present invention.

DETAILED DESCRIPTION OF EMBODIMENTS

Figure 1:
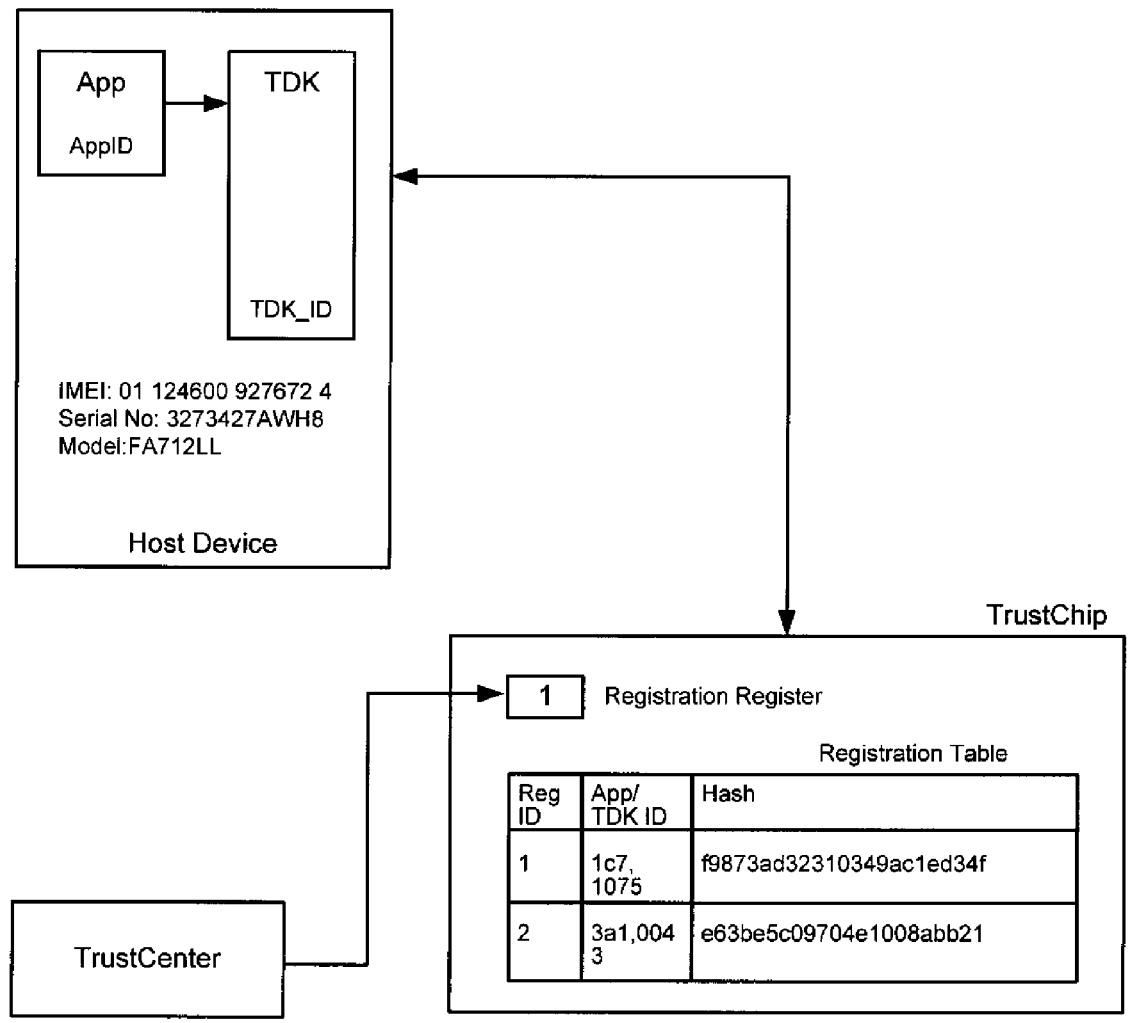
FIG. 1 is a schematic diagram illustrating an embodiment of the present invention.

Certain embodiments of the present invention prevent entities whose access is not intended from accessing data stored in persistent storage modules. Such modules may be modules as described in U.S. Patent Application No. 61/103,111 filed Oct. 6, 2008 entitled "System For and Method Of Cryptographic Key Provisioning" to Fascenda et al., the disclosure of which is incorporated by reference. Such modules may take the form factor of a standard memory card. Exemplary form factors include, by way of non-limiting example, Secure Digital ("SD"), mini SD, micro SD, PCMCIA, P2, Compact Flash, Memory Stick, PRO Memory Stick, PRO Duo Memory Stick, Micro Memory Stick, SmartMedia Memory Card, MultiMedia Memory Card, Reduced Size MultiMedia Memory Card, MultiMedia Memory Card Mobile, MultiMedia Memory Card Plus, MultiMedia Memory Card Micro, xD Memory Card, USB, single in-line package ("SIP") and dual in-line package ("DIP"). Other form factors are also possible. Certain embodiments of the present invention include modules that incorporate cryptographic functionality internal to the module itself, which allows the addition of secure data storage and retrieval by wide range of devices.

Modules according to some embodiments of the present invention may be coupled to devices, such as, by way of non-limiting example, computers (e.g., laptop or desktop computers), Personal Digital Assistants ("PDA"), mobile telephones (e.g., cellular telephones), cameras or music playing devices (e.g., MP3 players). Such devices may contain software that interacts with the modules to which they are coupled. Further, such devices may provide a mechanism (e.g., a keyboard or a touchscreen) by which a user may enter data, which may be sent to the module by the device. Such devices may further include a display mechanism, which may display data that originates from a module.

A first protection mechanism according to some embodiments of the present invention requires entry of a Personal Identification Number ("PIN") in order to access data stored in a persistent storage module. More particularly, every time power is applied to a module according to some embodiments of the present invention, the module requires entry of a PIN. The PIN may be entered into a device to which the module is coupled and sent to the module, which processes the entered information and internally compares it against an internally stored and encrypted PIN. If the entered PIN matches the stored PIN, which may be decrypted internal to the module for the comparison, then the module allows access to its contents. Otherwise, the module may disable one or more of its functions, such as preventing access to its internally stored data. Certain embodiments of the present invention include additional techniques for securely storing data and preventing access to such data by unauthorized individuals.

Certain embodiments of the present invention provide a technique whereby one or more devices are registered to work with a particular module. In some embodiments, a module will not operate when coupled to a device to which it has not been previously registered. In some embodiments, when a module is inserted into a non-registered device, the module will not allow any access to its protected information.

Some embodiments allow an application, which may be executing in the device, the module coupled to the device, or externally to the module and the device, to authenticate itself to the module. In such embodiments, the application may not be granted access to a portion or the entirety of the module unless it has previously registered with the module. Such embodiments may utilize a cryptographic signature on the application. The cryptographic signature may be included in a digital certificate, which may be cryptographically signed by a registration authority (TrustCenter) associated with the module, by a third party authority, or by an entity associated with the application. The signature or certificate may include information that identifies the application and the organization that developed or released the application. The module may access and verify an application's signature or certificate prior to granting the application access to the module's resources. Policy controls may govern what applications may be granted access to the module's resources.

Thus, certain embodiments of the present invention provide a technique whereby one or more devices and associated applications are registered to work with a particular module. In some embodiments, a module may not operate when coupled to a device to which it has not been previously registered. Even if the device has registered with the module, the module may prevent an application from interacting with the module if the application itself has not been previously registered. In some embodiments, a module will not allow any application to access to the module's protected information unless both the application and the device to which the module is couple have been previously registered with the module.

In some embodiments of the present invention, the registration process is externally managed under supervision of an entity such as a registration authority associated with the module or an enterprise management application.

In the present document, a module may be referred to as a "TrustChip." TrustChips are available from KoolSpan, Inc. of Bethesda, Md. However, the term "TrustChip" as used herein is meant to embrace an actual KoolSpan TrustChip as well as other modules having more, less, or different functionality from KoolSpan TrustChips. That is, in the present document, the term "TrustChip" is meant to be synonymous with the generic term "module." The term "module" embraces, but is not limited to, a TrustChip available from KoolSpan.

In the present document, the term "TrustCenter" includes, but is not limited to, a registration authority, which may be associated with a given module or may be a third-party registration authority. As used herein, the term "TrustCenter" is meant to embrace a KoolSpan registration authority as well as other registration authorities that may or may not be implemented by KoolSpan.

FIG. 1 is a schematic diagram illustrating an embodiment of the present invention. In particular, FIG. 1 illustrates a device coupled to a module. The device may be, by way of non-limiting example, a mobile phone. The device may be uniquely identified by one or more identifying parameters. In the case of a mobile phone, such parameters may include one or more of an International Mobile Equipment Identity ("IMEI") number, a manufacturer serial number, a computer processor serial number, and a model number.

To utilize the functionality of the module, a registration program may be provided. The registration program may be generated utilizing, by way of non-limiting example, a Trust-Chip Developer Kit ("TDK") available from KoolSpan of Bethesda, Md. The registration program may execute on the device, on the module, or in combination with both. The registration program may permit or prevent communications between the module coupled to the device and an application running on the device, on the module, or in combination with both.

In some embodiments, the software library that is part of the TDK is serialized for each application developer. That is, the software library and its included functions may have associated serial numbers or other identification. The developer may further identify each secure application to the software library with an application identification, which may be a digital signature on the application or a digital certificate as describe above.

The module of FIG. 1 is depicted as containing a registration table, which itself may include one or more of registration information generated by the registration application, one or more application identifications, and a software library identification. The table may allow for multiple registrations. The table may allow for separate or combined application and device registrations.

FIG. 1 further illustrates a registration authority. In some embodiments, the registration authority (TrustCenter) controls the registration process and sets a registration state within a particular module. The registration authority may assist in providing or storing cryptographic policy information such as, by way of non-limiting example, how the device or user connects through a web portal or receives an indication over the air, via SMS or via a dial-in connection. Such registration authorities may communicate using encryption. By way of non-limiting example, data sent to a registration authority from a module may be encrypted using an import key or personalization key as those terms find meaning in U.S. Patent Application No. 61/103,111 filed Oct. 6, 2008 entitled "System For and Method Of Cryptographic Key Provisioning" to Fascenda et al.

Figure 2:
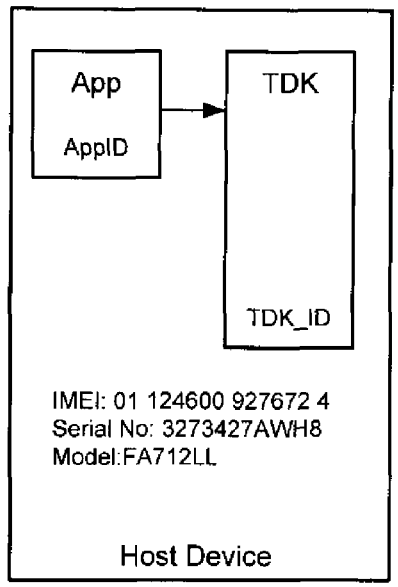
FIG. 2 is a schematic diagram of a portion of a registration technique according to an embodiment of the present invention.
Figure 2:
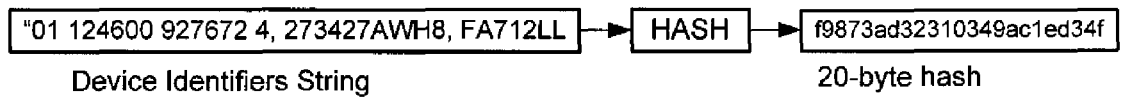

FIG. 2 is a schematic diagram of a portion of a registration technique according to an embodiment of the present invention. When a device is registered with a module, device-specific information may be gathered by a registration application. Such information may include information that uniquely identifies the particular device. When an application is registered with a module, application-specific information may be gathered by the registration application. Such information may include information that uniquely identifies the particular developer and information that uniquely identifies the particular application. Device-specific and application-specific information may be concatenated by the registration application and passed into a portion of the registration application that generates a cryptographic hash of this information. The registration information, whether including device registration information, application registration information, or a combination of both, may then be passed into the module by the registration application to be stored securely in a registration table within module. An exemplary registration table is illustrated schematically in FIG. 1.

As the hash may output a fixed-length value, there is essentially no restriction on the parameters that may be input into the hash function. Each application developer is free to include additional parameters beyond the minimum that is set by the policies the developer thinks are important to protect his or her application. The inclusion of one or both of an application identification and a software library identification allows for great flexibility within a module to protect information on an application-by-application basis. For example, a module that is unlocked by a specific application might only have access to memory that is relevant to that particular application. A developer could produce several applications that can securely store information on the module that would only be available to that developer's application(s). The application identification and software library identification further allow an audit trail to be maintained to identify which device(s) and application(s) have accessed a particular module.

Figure 3:
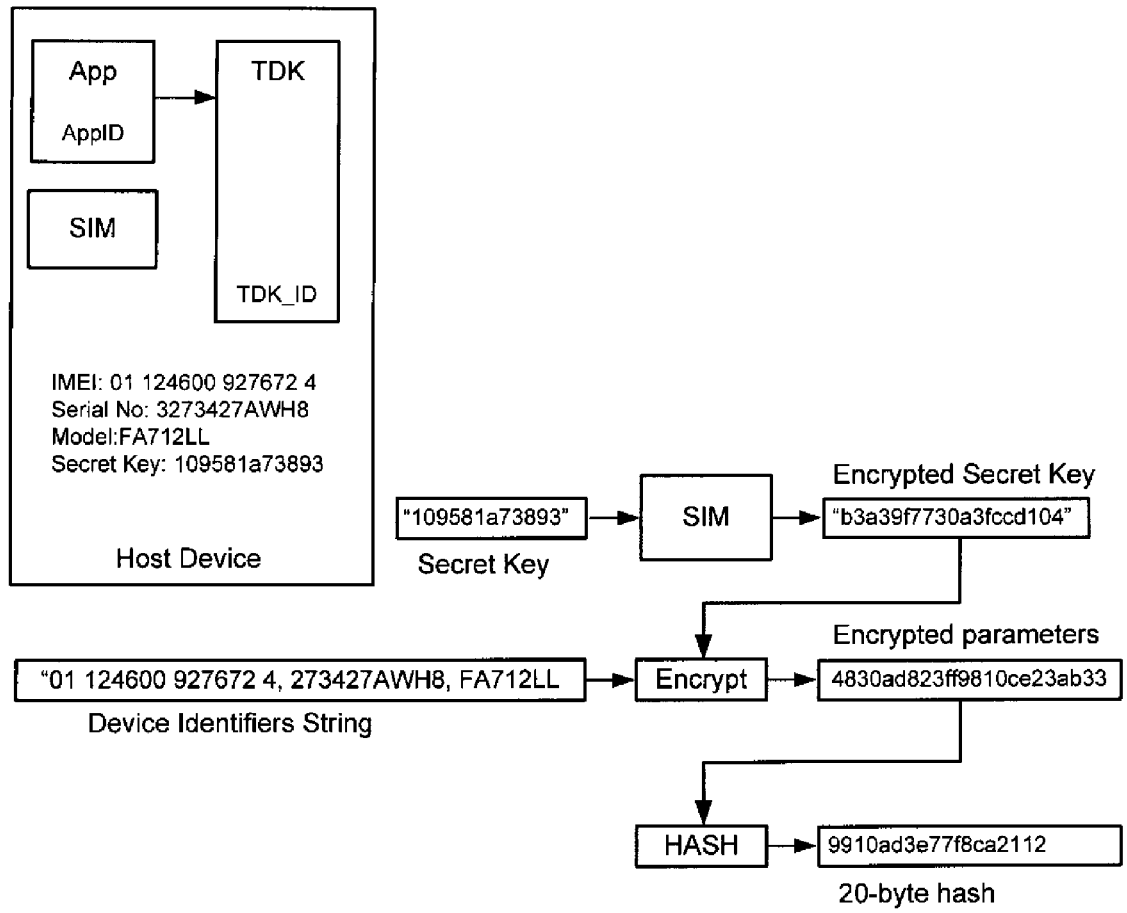
FIG. 3 is a schematic diagram illustrating a registration technique according to an embodiment of the present invention.

FIG. 3 is a schematic diagram illustrating a registration technique according to an embodiment of the present invention. As certain device numbers (e.g., IMEI and device serial numbers) can be spoofed, that is, read and copied into another device, the registration application can avail itself of additional storage space in the module, in the device to which the module is coupled, or in a different module coupled to the device or module. In such embodiments, the registration information is not stored in a single place. Instead, various portions or copies of the registration information may be stored in one or more of the module, the device, or a different module coupled to the device or to the module. Accordingly, any malicious entity would need to have all components assembled to more easily assert an attack.

For example, a mobile phone may be coupled to a SIM card, which is unique and includes a serial number. Many SIM cards have the capability to generate keys and store and encrypt data. The registration application or the SIM may generate a secret key, which the SIM internally encrypts using a key stored in the SIM. The encrypted secret key may be stored securely in the module. The encrypted key may then be used to encrypt the registration data prior to the registration data being hashed. Thus, even if the device-specific parameters are known and spoofed, the registration would fail because the registered hash would only be verified if the device-specific parameters could be encrypted with the device-specific secret key encrypted by the SIM.

Figure 4:
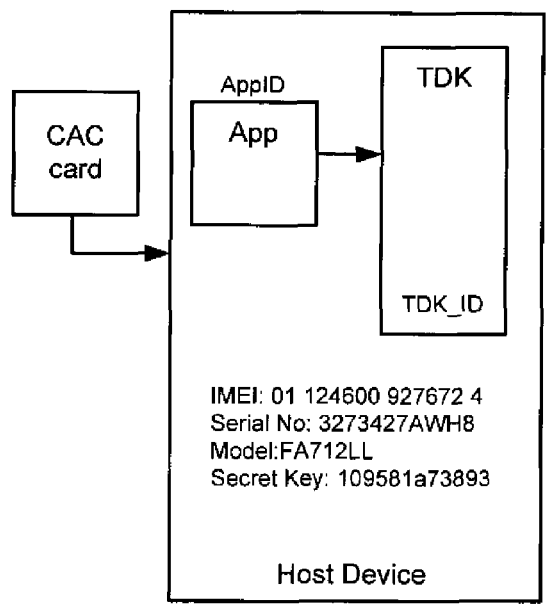
FIG. 4 is a schematic diagram illustrating a registration technique according to an embodiment of the present invention.
Figure 4:
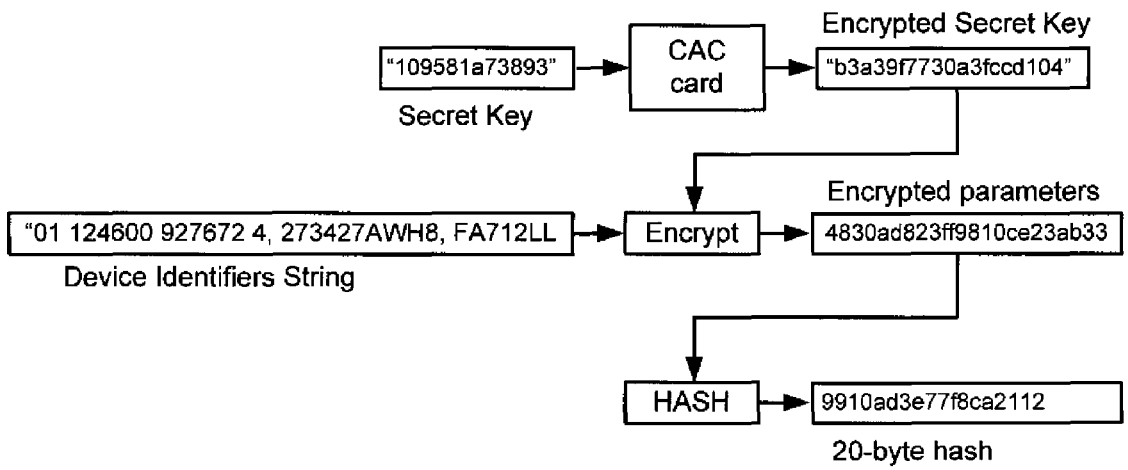

FIG. 4 is a schematic diagram illustrating a registration technique according to an embodiment of the present invention. The device as depicted in FIG. 4 may be, by way of non-limiting example, a personal computer. One or more of the computer's serial number, model number and computer name may be used as registration information. Although such information may be cloned, an external module such as a smart card, SIM card, or Common Access Card ("CAC") may be used to enhance the security by internally encrypting and storing a key that is used to encrypt the registration information.

Figure 5:
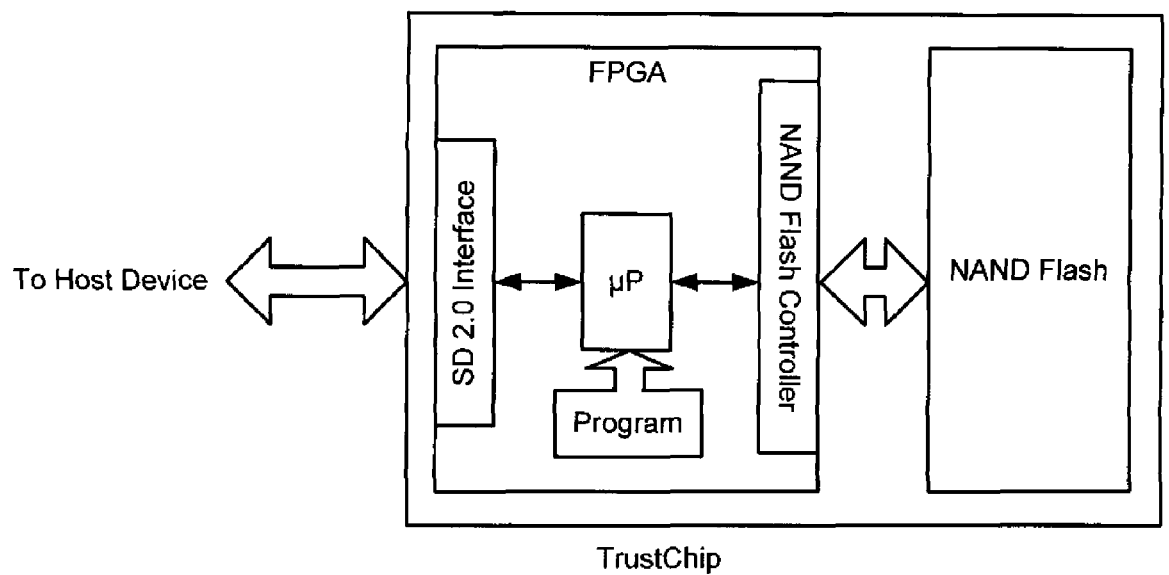
FIG. 5 is a schematic diagram illustrating an architecture of an exemplary module according to an embodiment of the present invention.

FIG. 5 is a schematic diagram illustrating an architecture of an exemplary module according to an embodiment of the present invention. As illustrated in FIG. 5, the module may include a Field Programmable gate Array ("FPGA") and a NAND Flash memory portion. The memory may be coupled to the host device through the FPGA. The FPGA may be configured to implement the SD 2.0 standard interface along with programming that manages the NAND Flash memory. A microprocessor implemented within the FPGA may manage the transfer of data between the SD 2.0 interface and the NAND Flash memory under program control. A module as described in U.S. Patent Application No. 61/103,111 filed Oct. 26, 2008 entitled "System For and Method Of Cryptographic Key Provisioning" to Fascenda et al. may be used.

The control program may be in a position to present to the device an interpreted version of the module's file system of the NAND Flash memory. When the module is powered up and registration is enabled, the control program may initially present an empty or minimal file system to the device until an unlock command is executed by an authorized, registered application. The unlock command may serve to verify that one or more of the device and application have been appropriately registered. Once unlocked, the particular area of the file system may become available to the device as permissions dictate. The microprocessor and control program can thus present the module's file system or variant of the file system in any number of forms appropriate to the device and as permissions dictate. Until a module is unlocked, the module may only respond to a minimal set of commands that enable the module to be unlocked by verifying that the module is appropriately registered.

Identifying parameters for registered devices may be maintained in a secure memory area of module in a table that provides for entry of multiple device registrations. (FIGS. 1 and 4 illustrate exemplary such tables.) Management of the registration process may be controlled by a remote Trust-Center or management application.

Modules may internally store various registration state parameters. The module may be delivered containing a registration state set to zero (0). This state indicates that the module is permitted to work with any host device. If registration is desired, the management entity may issue a command to the specific module setting the registration parameter to one (1), thus preventing the module from responding to any device that is not already registered. If a new device registration is desired, the management entity may set the registration parameter to two (2), thus enabling entry of a new device to be registered. If a device is recognized by the module, the registration register may be set to three (3), indicating that the module is now available to the host. The Table below illustrates exemplary registration parameters.

TABLE

| Registration State | Description |
|---|---|
| 0 | Unlocked |
| 1 | Registration Required |
| 2 | New Device Registration Allowed |
| 3 | Module Available To Host |

When module is powered up, it may initiate a start-up sequence identifying itself to the device. By way of non-limiting example, the start-up sequence may be a sequence conforming to the SD 2.0 standard. The sequence may include providing to the device one or more of the module's chip identification ("CID") number and other various SD 2.0 parameters. The module, prior to allowing any read or write access to its memory, may check its registration parameter. On power up, according to some embodiments, the registration state can only be zero (0) or one (1). The state may be set or changed by a TrustCenter. The registration state, if not zero (0) on power-up, may automatically be reset to one (1) by the module. Thus, on power-up, the registration enable state may be cleared, as well as the unlock state.

Once the registration state is set to one (1), the module may only respond a minimal set of commands from an application on the device to unlock the module. The device application may be required to check the module's register state, and, if set to one (1), the module may be required to execute an unlock command. If the device application detects a registration state of two (2), it may be allowed to execute a device registration command within a timed window, after which the register may automatically reset to one (1). The duration of the window may be any of, by way of non-limiting example, ten microseconds, one hundred microseconds, one second, two seconds, five seconds, ten seconds, twenty seconds, thirty seconds or one minute.

Figure 6:
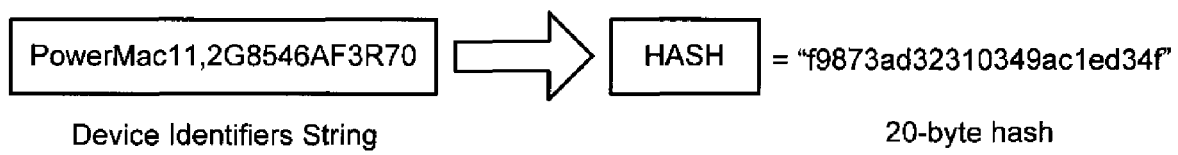
FIG. 6 illustrates identification information according to an embodiment of the present invention.

FIG. 6 illustrates identification information according to an embodiment of the present invention. The registration application, using any identification information as previously described, may generate a registration state. For example, the application developer of a Mac OS X program might elect to pick the machine's Serial Number and Model Name as follows:

Device Identifiers="PowerMac 11,2G8546AF3R70"

The output of the registration application to a device registration command may be a hash of one or more of the desired device-specific information, the application identification and the software library identification. The device-specific information may be left entirely up to the application programmer. Whatever information is used to register the host may be reacquired during issuance of the module unlock command.

FIG. 7 is a detail of a registration table according to an embodiment of the present invention. The registration table, if stored within the module, may be maintained in a secure area and protected by various on-chip security mechanisms rendering the information within the table completely inaccessible by any means outside of the module. Thus, the registration information may not be readable outside of the module. In such instances, the module may perform all comparisons necessary for the registration and verification operations internal to the module.

The registration data may be hashed by the registration application and entered into the registration table within the module along with the application identification and software library identification. The administrator may clear the table and the module may subsequently have to be re-enabled for each device by an administrator. However this may result in loss of information pertaining to the cleared registration(s) as the information may be cryptographically secured to that previous registration.

When a device-side application desires to unlock a module (registration state 1), the application may generate the same registration data used in the device registration phase. This data may be generated by the application in the same way as the registration process and the registration application may pass this information to the module via the unlock command. The hash, application identification and software library identification may be compared against entries in the table. If a match is obtained, the registration state for that entry may be set to three (3) or access allowed. If no valid match is obtained, in some embodiments, there is no response to the host, the registration state remains at one, and the module may enforce a minimum timeout between successive attempts to thwart continuous brute force attacks.

Unless otherwise stated, any of the cryptographic algorithms referred to herein may be symmetric or asymmetric. By way of non-limiting example, cryptographic keys referred to herein may have the following number of bits: 128, 256, 512, 1024 and 2048. Any of the cryptographic keys referred to herein may be used for, by way of non-limiting example, cryptographic operations using a GCM-AES algorithm.

Other embodiments, uses, and advantages of the present invention will be apparent to those skilled in the art from consideration of the specification and practice of the present invention disclosed herein. The specification and drawings should be considered exemplary only, and the scope of the present invention is accordingly intended to be limited only by the following claims and equivalents thereof.

We claim:

1. A method for authenticating a device to a cryptographic module and authenticating a software application to the cryptographic module, the cryptographic module comprising hardware coupled to the device, the cryptographic module further comprising persistent storage arranged in a file structure of the cryptographic module, at least a portion of the software application configured to execute on the device, the method comprising:

registering the software application and the device to the cryptographic module, the registering the software application and the device comprising:
retrieving a device identification from the device;
producing combined registration data comprising a software application identification, a developer identification for a developer associated with the software application, the device identification, and a software library identification for a software library associated with the application;
hashing the combined registration data to produce a combined hash registration code; and
storing the combined hash registration code in at least one of the module, the device and a second module;
preventing the device from fully accessing the file structure of the cryptographic module unless the device has previously registered with the cryptographic module, the device is permitted a first limited access to the file structure of the cryptographic module prior to the device being authenticated to the cryptographic module;
preventing the software application from fully accessing the cryptographic module unless the software application has previously registered with the cryptographic module, the software application is permitted a second limited access to the cryptographic module prior to the software application being authenticated to the cryptographic module;
authenticating the device to the cryptographic module and authenticating the software application to the cryptographic module, the authenticating the device to the cryptographic module and the authenticating the software application comprising:
retrieving a device identification from the device;
producing combined authentication data comprising the application identification, the developer identification for the developer associated with the software application, the device identification, and the software library identification for the software library associated with the application;
hashing the combined authentication data to produce a combined hash authentication code;
retrieving the combined hash registration code from the at least one of the module, the device and the second module;
comparing the combined hash registration code to the combined hash authentication code, the comparing occurs internal to the cryptographic module; and
in response to a match detected by the comparing the combined hash registration code to the combined hash authentication code, permitting the device to access a portion of the file structure of the cryptographic module in addition to the first limited access to the file structure of the cryptographic module, and permitting the software application to access a portion of the cryptographic module in addition to the second limited access to the cryptographic module.

2. The method of claim 1, wherein the device comprises a mobile telephone.

3. The method of claim 1, wherein the cryptographic module comprises an integrated circuit configured for insertion into a mobile telephone.

4. The method of claim 1, further comprising encrypting the combined registration data using a key supplied by the cryptographic module prior to storing the combined hash registration code.

5. The method of claim 1, further comprising the cryptographic module storing a registration state parameter indicating a level of availability of the cryptographic module to the device.

6. A method for authenticating a device to a cryptographic module, the cryptographic module comprising hardware coupled to the device, the cryptographic module further comprising persistent storage arranged in a file structure of the cryptographic module, the method comprising:
   registering the device to the cryptographic module, the registering the device comprising:
      retrieving a device identification from the device;
      producing registration data comprising the device identification and at least one additional identifier;
      hashing the registration data to produce a hash registration code; and
      storing the hash registration code in at least one of the module, the device and a second module;
   preventing the device from fully accessing the file structure of the cryptographic module unless the device is authenticated to has previously registered with the cryptographic module, the device is permitted a limited access to the file structure of the cryptographic module prior to the device being authenticated to the cryptographic module;
   authenticating the device to the cryptographic module, the authenticating the device to the cryptographic module comprising:
      retrieving the device identification from the device;
      producing authentication data comprising the device identification and at least one additional identifier;
      hashing the authentication data to produce a hash authentication code;
      retrieving the hash registration code from the at least one of the module, the device and the second module;
      comparing the combined hash registration code to the combined hash authentication code, the comparing occurs internal to the cryptographic module; and
      in response to a match detected by the comparing the combined hash registration code to the combined hash authentication code, permitting the device to access a portion of the file structure of the cryptographic module in addition to the limited access to the file structure of the cryptographic module.

7. The method of claim 6, wherein the device comprises a mobile telephone.

8. The method of claim 6, wherein the cryptographic module comprises an integrated circuit configured for insertion into a mobile telephone.

9. The method of claim 6, further comprising encrypting the registration data using a key supplied by the cryptographic module prior to storing the hash registration code.

10. The method of claim 6, further comprising the cryptographic module storing a registration state parameter indicating a level of availability of the cryptographic module to the device.

11. A system for authenticating a software application to a cryptographic module, the cryptographic module comprising hardware coupled to a device, the cryptographic module further comprising persistent storage arranged in a file structure of the cryptographic module, at least a portion of the software application configured to execute on the device, the system comprising:
   registering the software application to the cryptographic module, the registering the software application comprising:
   producing registration data comprising a software application identification, a developer identification for a developer associated with the software application, and a software library identification for a software library associated with the application;
   hashing the registration data to produce a hash registration code; and
   storing the hash registration code in at least one of the module, the device and a second module;
   preventing the software application from fully accessing the cryptographic module unless the software application has previously registered with the cryptographic module, the software application is permitted a limited access to the cryptographic module prior to the software application being authenticated to the cryptographic module;
   authenticating the software application to the cryptographic module, the authenticating the software application comprising:
   producing authentication data comprising the application identification, the developer identification for the developer associated with the software application, and the software library identification for the software library associated with the application;
   hashing the authentication data to produce a hash authentication code;
   retrieving the hash registration code from the at least one of the module, the device and the second module;
   comparing the hash registration code to the hash authentication code, the comparing occurs internal to the cryptographic module; and
   in response to a match detected by the comparing the hash registration code to the hash authentication code, permitting the software application to access a portion of the cryptographic module in addition to the limited access to the cryptographic module.

12. The system of claim 11, wherein the device comprises a mobile telephone.

13. The system of claim 11, wherein the cryptographic module comprises an integrated circuit configured for insertion into a mobile telephone.

14. The system of claim 11, further comprising encrypting the registration data using a key supplied by the cryptographic module prior to storing the hash registration code.

15. The system of claim 11, further comprising the cryptographic module storing a registration state parameter indicating a level of availability of the cryptographic module to the device.

* * * * *

UNITED STATES PATENT AND TRADEMARK OFFICE
CERTIFICATE OF CORRECTION

| | | |
|---|---|---|
| PATENT NO. | : 8,364,978 B2 | Page 1 of 1 |
| APPLICATION NO. | : 12/324471 | |
| DATED | : January 29, 2013 | |
| INVENTOR(S) | : Fascenda et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 632 days.

Signed and Sealed this
Twenty-sixth Day of August, 2014

Michelle K. Lee
*Deputy Director of the United States Patent and Trademark Office*